Patented Aug. 26, 1941

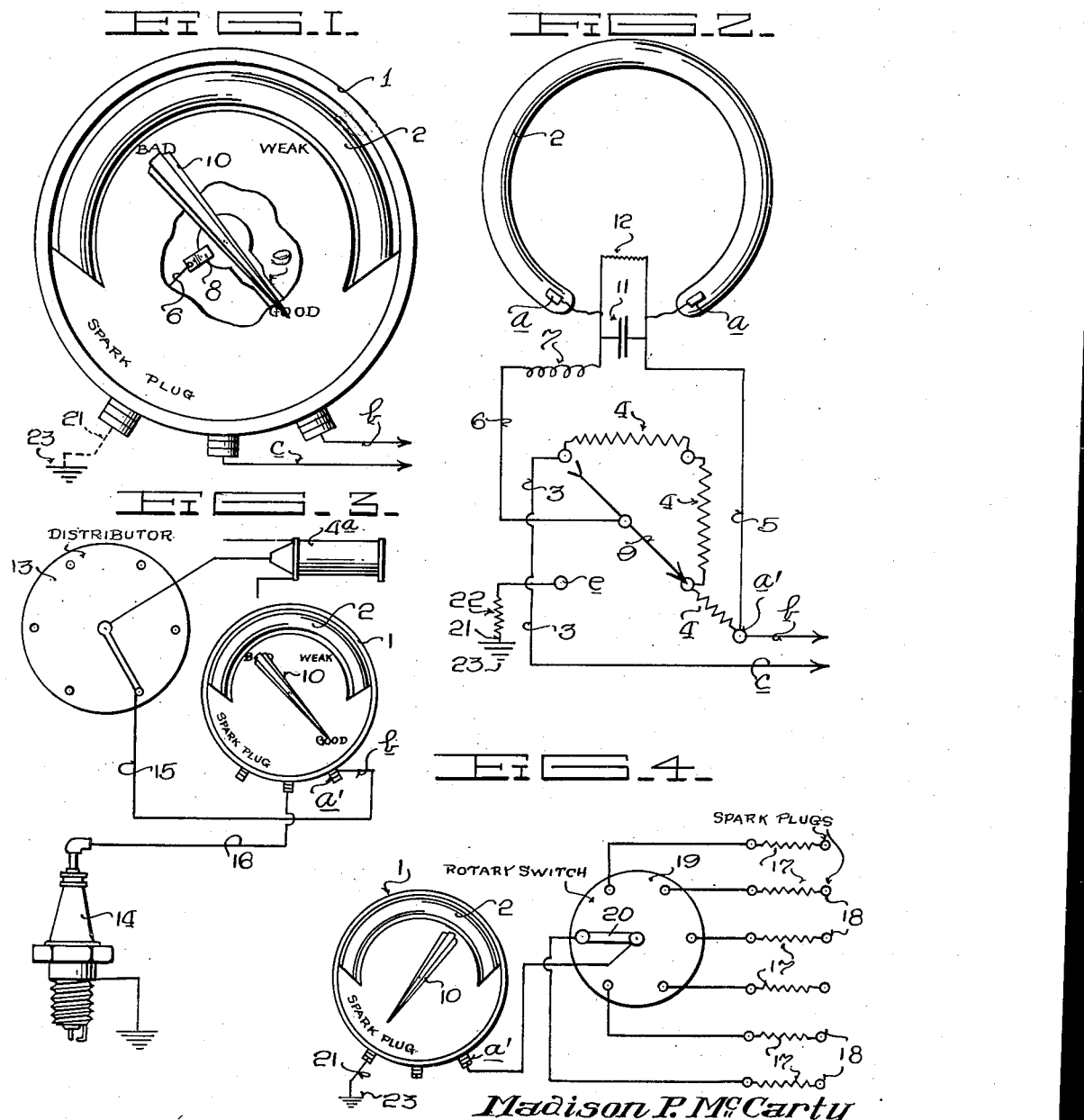

2,254,080

UNITED STATES PATENT OFFICE 2,254,080

ELECTRICAL SYSTEM TESTING DEVICE

Madison P. McCarty, Dallas, Tex., assignor of fifty per cent to Cornelius A. Donovan, Dallas, Tex.

Application July 20, 1940, Serial No. 346,495

7 Claims. (Cl. 175—183)

This invention relates to testing apparatus for electrical circuits and more particularly to a current measuring device whereby the electrical characteristics of the secondary circuits of an internal combustion engine coil may be determined.

The principal object of the invention is to provide a testing apparatus employing a fluorescent tube for revealing any irregularities in the function of the ignition points, condenser, the secondary of the ignition coil and even the spark plugs by slight adjustment of the current input wire with respect to certain designated points.

Another object of the invention is to provide a testing apparatus of the character specified which, due to its portability and the convenience by which the device may be temporarily secured to certain parts of the vehicle such as the windshield, instrument panel or the like, tests of the entire ignition system of a vehicle may be made on the road under actual operating conditions, rather than in the manner usually done at idling speeds.

With the foregoing objects as paramount, the invention has particular reference to its salient features of construction and arrangement of parts which will become manifest as the description proceeds, taken in connection with the accompanying drawing, wherein:

Figure 1 is an elevational view of the invention with portions broken to illustrate internal parts.

Figure 2 is a schematic wiring diagram of the form shown in Figure 1.

Figure 3 is a schematic wiring diagram of the invention connected for series testing of spark plugs, and Figure 4 shows the invention in which individual spark plugs are selectively tested in multiple.

Before entering into a detailed description of the drawing, a brief dissertation concerning the functions of the invention will be given.

The device provides for a constant resistance in series with the secondary circuit of an ignition coil, whereby to provide a constant current value through the resistance network, which may be separate resistors connected in series or, a resistance unit having variable means. In this resistance network, it will be seen that a fall of potential or a voltage drop occurs, thus providing variable exciting voltage, or current, for the fluorescent tube by virtue of this voltage drop through the resistance network.

In Figures 1 and 2 is illustrated the invention in which a constant resistance is in series with the secondary circuit of the ignition coil, thereby giving a constant current value through the resistance. In this circuit, the fluorescent tube indicator takes exciting voltage by reason of the voltage drop through the resistance. The tube indicator may be shunted across either the entire resistance limit, or any part thereof, there being provided outside of this limit, a resistance to prevent entire shunting of the tube. Thus, the tube indicator receives either the full voltage drop across the resistor or the voltage drop across any selected part of the resistor which it shunts.

Continuing with a more detailed description of the drawing, I designates a casing or housing, preferably of a suitable insulating material such as Bakelite. Within this housing is a tube 2 containing electrically excitable gas or gases. The electrodes $a$ of this tube are connected to respond to a current flow through a resistance network comprised of wire 3, in which is arrange a plurality of fixed resistors 4. The lead $b$ of wire 3 is connected to the secondary of an ignition coil 4a, (shown only in Figure 3) and the other lead $c$ connects to the central post of a distributor (not shown), thereby connecting the testing device in series with the coil and distributor.

The tube circuit is comprised of one leg 5, permanently connected at $a'$ to the current input. The other leg 6 includes a radio frequency choke coil 7, for preventing undesirable frequencies in the tube circuit. The leg 6 of the tube circuit is connected by means of a spring or brush contact 8 (Figure 1) to the contact arm 9 of switch 10. A high tension type of condenser 11, is shunted across the electrodes $a$ of the tube 2, as is a high resistance 12. This is for the purpose of stabilizing the current flowing to the tube from a high tension source.

When the device is connected, as explained, in series with the coil and distributor, current which would normally flow from the coil to the distributor will then flow through the resistance network, as hereinbefore explained, and will produce a constant current value through the entire network. Thus, the tube receives exciting voltage by reason of the voltage drop across the resistance network.

Obviously, a weak coil under test requires all of the voltage drop to excite the tube, therefore the switch 10 will have to be moved to the position marked "Bad". Such a coil will cause approximately full fluorescence with the switch at this point, due to the fact that it requires the entire voltage drop to furnish sufficient current to excite the gases in the tube. In the case of a normal coil, the switch 10 will be disposed in the position shown, i. e., across but one resistance 4, taking off a minimum of voltage drop of the resistance network, due to the fact that more current is flowing through the network. Accordingly, the tube will have normal fluorescence.

Now, when the device is used for testing spark plugs, it is connected in the manner shown in Figure 3. The device is connected in series with the distributor 13 and the spark plug 14 through wires 15 and 16, the former being connected at a' to the input wire b of the device. The output wire 16 connects the device with the individual spark plug 14. The resistance in the spark plug gap is varied, due to carbon deposits, spacing of the points or for other reasons, therefore the variance in resistance is immediately indicated in the tube 2 and the degree of such variance indicated by rotating the switch 10 to the various contact points in the resistance network.

In Figure 4 is shown the manner in which selective tests of individual spark plugs are made. A high resistance 17 is arranged in series with the spark plugs 18 and with a selective switch 19, whose rotatable member 20 is connected to the input post a' of the indicator housing.

It is necessary that the switch arm 10 be disposed in the manner shown in Figure 4. A ground wire 21 is provided to the vehicle frame to complete the circuit and has a resistance 22. In this position, all of the resistance network shown in Figures 1 and 2 is cut out and the current then flows through wire b, wire 5, thence through tube 2, out through choke 7, wire 6 to switch arm 9, thence to post e, through resistance 22, to ground at 23.

It is apparent from the foregoing that the device is in multiple with the high tension current delivered to the spark plug and the ground, thus showing whether or not the spark plug under test is grounded or the approximate condition thereof. If the spark plug gap is too wide a greater degree of fluorescence is shown and the reverse is true when the gap is too narrow. When the porcelain is broken on the spark plug sufficient to cause the latter to miss fire, this likewise will be disclosed by the behavior of the tube 2.

Manifestly, the construction as shown and described is capable of some modification and such modification as may be construed to fall within the scope and meaning of the appended claims is also considered to be within the spirit and intent of the invention.

What is claimed is:

1. Apparatus for testing the ignition system of an internal combustion engine, a fluorescent tube, a resistance network connected in series with the high tension circuit of said system, a tube circuit connected across said resistance network and means operative over said resistance network for varying the voltage drop received by said tube whereby to indicate the condition of said system.

2. A device for testing the ignition system of an internal combustion engine, a tube containing electrically excitable gases, a resistance circuit connected with the secondary of the coil of said ignition system, a tube circuit connected across the resistance in said resistance circuit and means operative over said resistance effective to vary the amount of voltage drop taken off said resistance to indicate the voltage and milliamperage of the secondary circuit of said coil.

3. A device for testing the ignition system of an internal combustion engine, a tube containing electrically excitable gases, a resistance circuit connected to the secondary of the coil of said ignition system, a tube circuit connected across the resistance of said resistance circuit, a condenser and a resistance shunted across the electrodes of said tube to stabilize and control said tube circuit, and means for varying the amount of voltage drop taken off said resistance to vary the amount of current to the electrodes of said tube.

4. In a device for testing the ignition system of an internal combustion engine, a spark plug firing indicator comprising a tube containing electrically excitable gases, a tube circuit connected in multiple with the spark plugs of said system, a resistance circuit across which said tube circuit is connected, a ground circuit, a resistance therein and switch means for directing the current flow from said resistance circuit to said ground circuit to produce in said tube a visual indication of the condition of said spark plugs.

5. In a device for testing the ignition system of an internal combustion engine, a firing indicator for spark plugs comprising a tube containing electrically excitable gases, a tube circuit, a selective switch, means connecting said tube circuit to said switch, resistance means connecting said switch to individual spark plugs and means carried by said switch for effecting a flow of current from individual spark plugs through said tube circuit.

6. In an apparatus for testing spark plugs of an internal combustion engine, a tube circuit comprising a tube containing electrically excitable gases glowing at a selected normal intensity and provided with two electrodes, a high resistance element and a high tension condenser shunted across said electrodes to stabilize current flowing through said tube, a radio frequency choke coil in series with said high resistance element and high tension condenser to eliminate undesired frequencies in the tube circuit, a plurality of fixed resistance elements operatively connected in series in the tube circuit, means in said circuit to selectively change the effective resistance of said fixed resistance elements in said tube circuit an indicated amount to return the glow of said tube to normal intensity from which it deviates due to a change in current flowing through the tube.

7. In an apparatus for testing spark plugs of an internal combustion engine, a tube circuit comprising a tube containing electrically excitable gases glowing at a selected normal intensity and provided with two electrodes, a high resistance element and a high tension condenser shunted across said electrodes to stabilize current flowing through said tube, a plurality of fixed resistance elements in series operatively connected to said electrodes in the tube circuit, means in said circuit to selectively change the effective resistance of said fixed resistance elements in said tube circuit an indicated amount to return the glow of the tube to normal intensity from which it deviates due to change in current flowing through the tube.

MADISON P. McCARTY.